Figure 1:
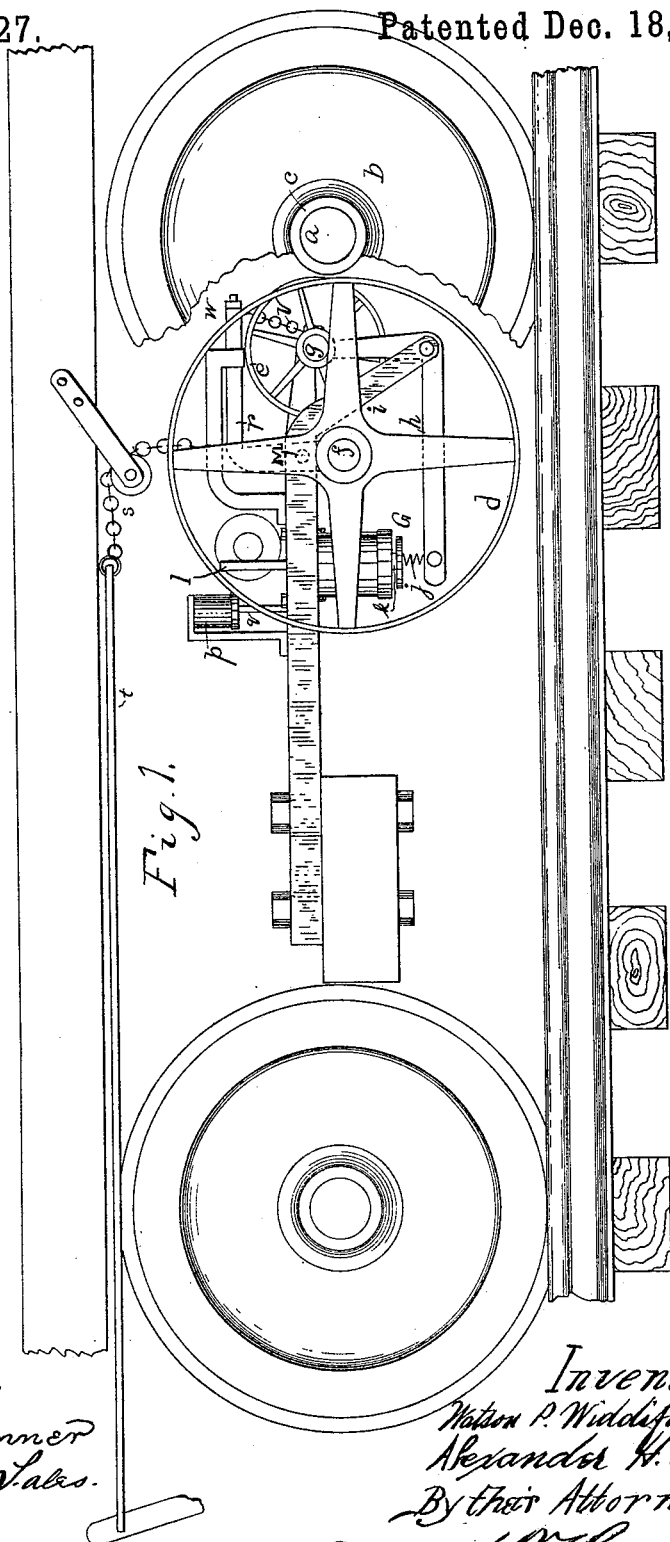

(No Model.) 4 Sheets—Sheet 1.

W. P. WIDDIFIELD & A. H. BOWMAN.
ELECTRIC BRAKE SYSTEM.

No. 394,627. Patented Dec. 18, 1888.

Witness:
Wm. J. Tanner
Agnes T. Saks.

Inventors:
Watson P. Widdifield
Alexander H. Bowman
By their Attorney,
Edward P. Thompson.

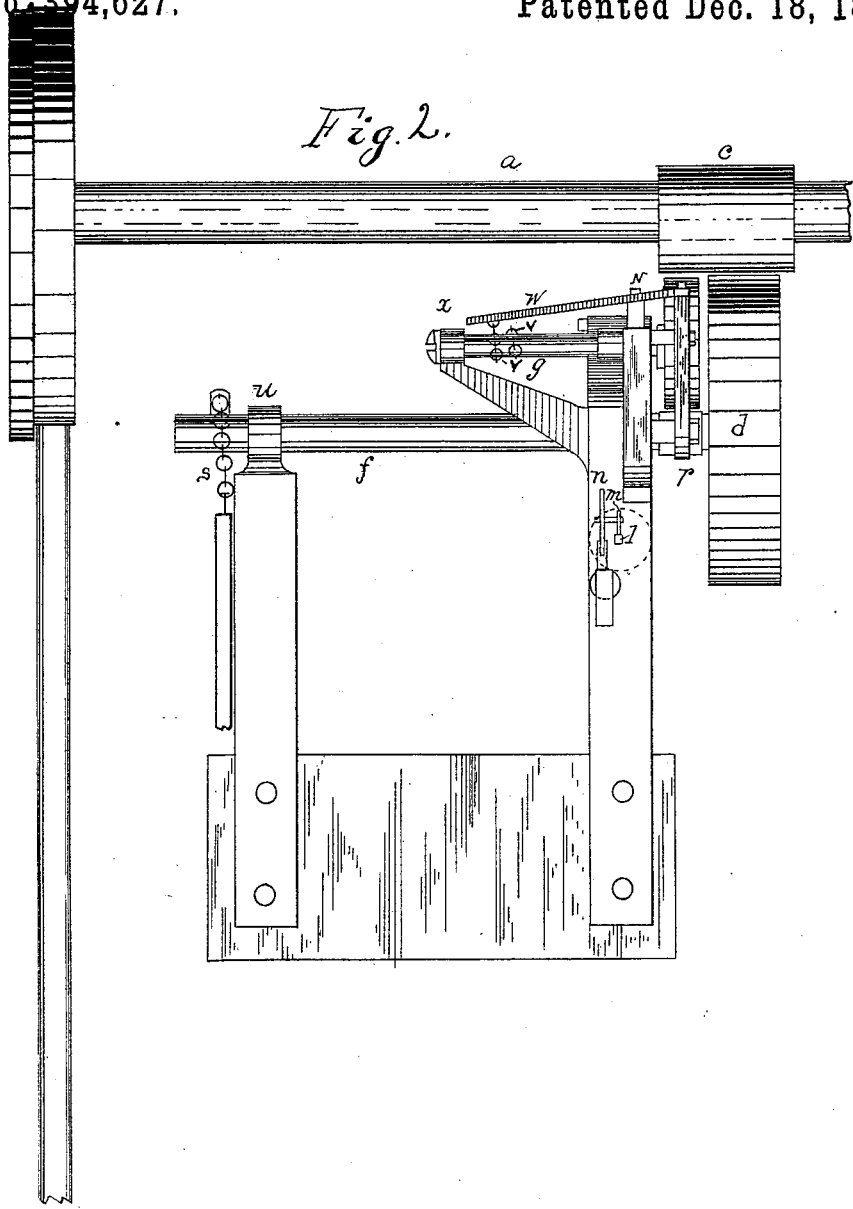

(No Model.) 4 Sheets—Sheet 3.
W. P. WIDDIFIELD & A. H. BOWMAN.
ELECTRIC BRAKE SYSTEM.
No. 394,627. Patented Dec. 18, 1888.
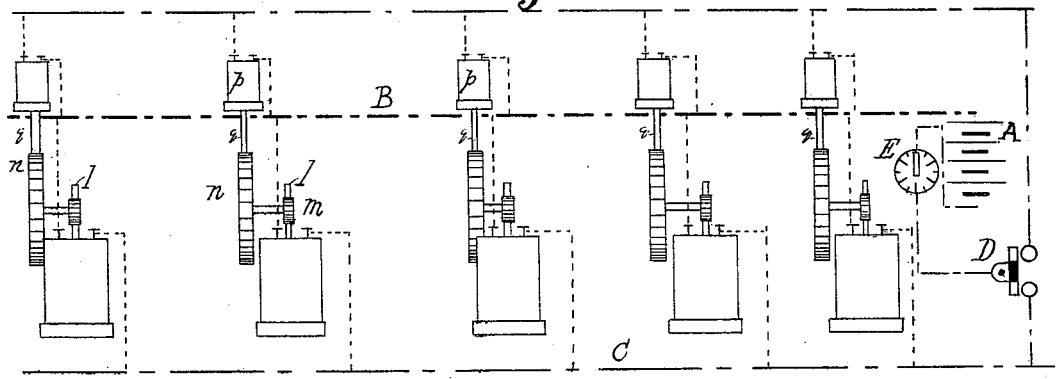
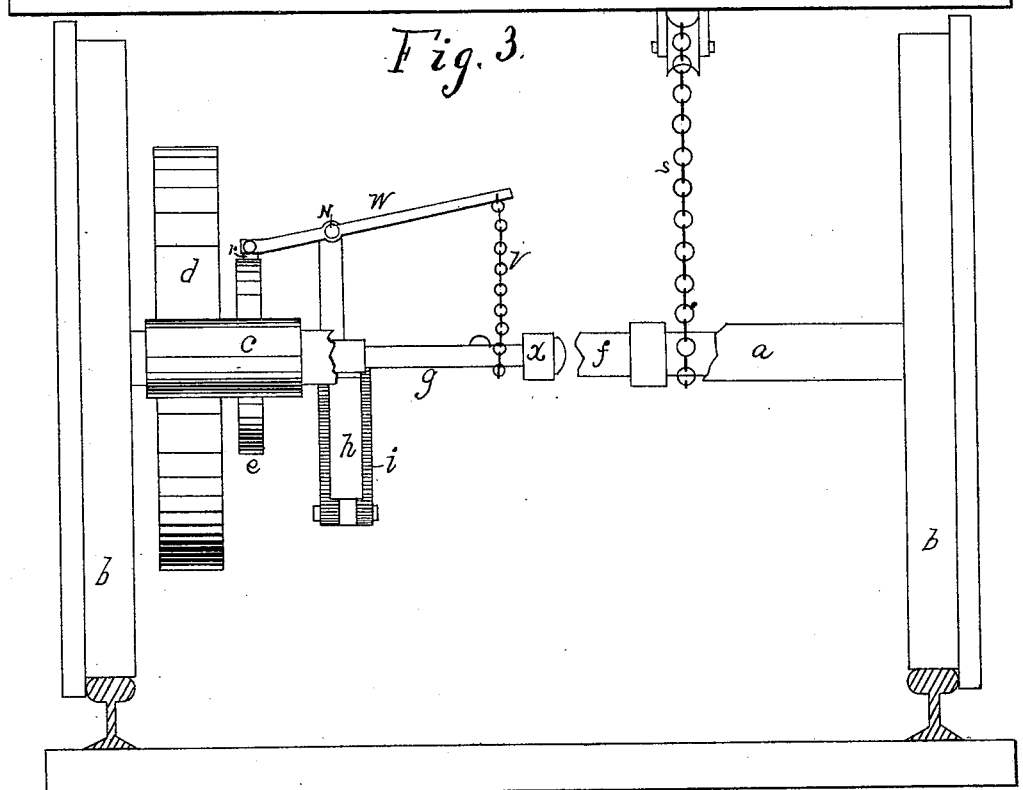

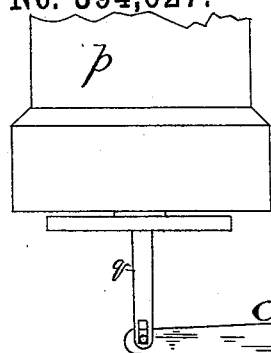
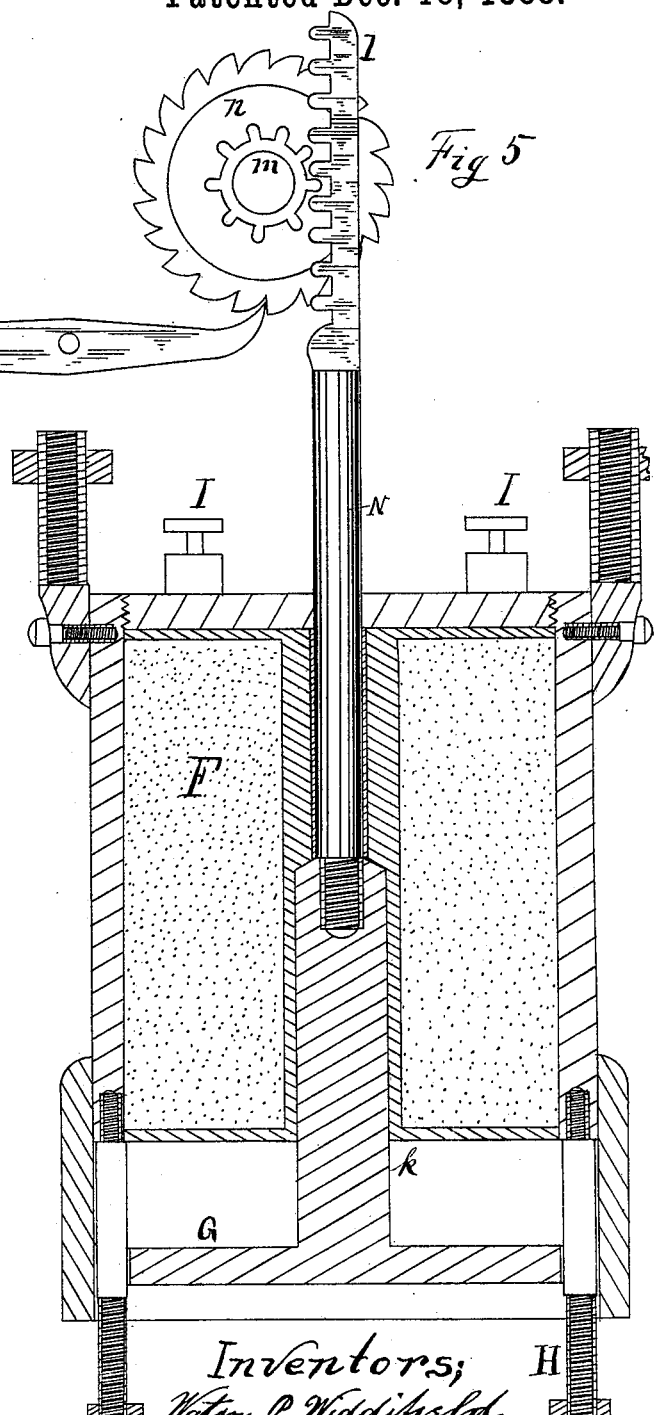

UNITED STATES PATENT OFFICE.

WATSON P. WIDDIFIELD, OF UXBRIDGE, ONTARIO, CANADA, AND ALEXANDER H. BOWMAN, OF PACKERTON, PENNSYLVANIA.

ELECTRIC-BRAKE SYSTEM.

SPECIFICATION forming part of Letters Patent No. 394,627, dated December 18, 1888.

Application filed February 8, 1888. Serial No. 263,373. (No model.)

*To all whom it may concern:*

Be it known that we, WATSON P. WIDDIFIELD, a subject of the Queen of Great Britain, residing at Uxbridge, in the county of Ontario, Province of Ontario, Canada, and ALEXANDER H. BOWMAN, a citizen of the United States, and a resident of Packerton, in the county of Carbon and State of Pennsylvania, have invented certain new and useful Improvements in Electric-Brake Systems, of which the following is a specification.

Our invention relates to an electric-brake system in which the momentum of the car-axle is automatically communicated to the brake-lever through the medium of simple mechanism.

The object of the invention is to provide means whereby the efficiency of the electric current may be increased. Instead of applying the electricity to lift the large friction-pulley against the car-axle, it is caused to place a smaller friction-pulley against the axle, while the force communicated to the latter pulley is transmitted by suitable mechanism to the large pulley. This said force throws the large pulley against the car-axle, and, being rotated, causes the brakes to press against the car-wheels. Another feature of the system consists in the simplicity of the mechanism employed to carry out the invention.

Referring to the drawings, Figure 1 is a side elevation of that portion of a car sufficient to set forth the nature of the invention. Fig. 2 is a plan view of the principal parts shown in Fig. 1. Fig. 3 is a front view of the parts shown in Figs. 1 and 2. In the above-named figures portions are broken away or omitted to prevent confusion. Fig. 4 shows the electric circuits and connections. Fig. 5 shows a vertical section of the electric device, some of the parts being illustrated in exterior view and other parts being in outline.

The system consists of the combination of a car-axle, $a$, supporting the two car-wheels $b$; an enlarged portion, $c$, or collar upon the axle; two friction wheels or pulleys, $d$ and $e$, the former being a little more than twice as large as the latter; an axle or shaft, $f$, for the pulley $d$, and another shaft, $g$, for the pulley $e$; a bent lever, $h$, supporting the smaller pulley and pivoted to a suitable support, $i$; an armature connected to the lever $h$ by means of a coil-spring, $j$, the armature being more properly termed a "core," $k$; a rack, $l$, secured to the upper part of the core and gearing into a pinion, $m$, which is upon the same shaft with a ratchet-wheel $n$; a pawl, $o$, gearing into the said ratchet-wheel and pivotally connected to the core of a solenoid, $p$, in such a manner that when the said core $q$ of the solenoid $p$ is pulled upward the core $k$ is pulled downward by the spring $j$; a second bent lever, $r$, supporting the axle $f$, and pivoted at a fixed point, M, nearer the left-hand end of the lever O than the right-hand end; a chain, $v$, connected at one end to the second bent lever, $w$, and at the other end to the axle $g$ of the smaller pulley, $e$, and a chain-connection, $s$, between the shaft $f$ of the large pulley $d$ and the brake-lever $t$.

The shaft $f$ fits rather loosely in the bearing $u$, so that the pulley $d$ may move and strike against the collar $c$ when the lever $r$ is operated by the chain $v$, which connects the lever $r$ with the shaft $g$ through the medium of the lever $w$, which is pivoted near its center at N. The shaft $g$ also, and for similar reasons, is loose in its bearing $x$.

The electric system shown in Fig. 4 consists of the combination of a suitable electrical generator, A, a wire, B, serving as one pole of the generator; two wires, C, adapted one at a time to be connected through the switch D with the other pole of the generator; a rheostat, E, in circuit between the generator and switch, and electric connections between the wire B and the wires C, the said connections including the solenoids. When the switch D is turned to the left, the large solenoid is included in a closed circuit, and when it is turned to the right the smaller solenoid is placed in a closed circuit. The wire B may be replaced by the metal portions of the train or by the rails of the track.

It is evident that the lever $t$ represents any suitable lever adapted to operate any convenient brakes for the wheels.

The solenoid shown in Fig. 5 consists of the combination of a spool, F, a core, $k$, located in the lower half, a non-magnetic rod, N, secured to the said core and terminated by a rack, $l$, a piece of iron, G, integral with the lower end of the core and lying parallel to the end of the spool, screws H, which serve not only as a means of fastening the device to any suitable support, but also as a guide for the piece G, so as to prevent the rack $l$ from rotating, and binding-posts I on the top of the solenoid.

The *modus operandi* of the system is as follows: When the switch D is rotated so that the current passes through the solenoid F and the rheostat E properly regulated, the core $k$ is elevated to the position shown in Fig. 5, its lower position being seen in Fig. 1. The lever $h$ is thus moved so as to press the smaller pulley, $e$, against the collar $c$, which, being supposed to be in motion, rotates the said pulley. The amount of electrical energy needed to lift the smaller pulley is only about one-fifth that which would be required to operate the large pulley. The pawl and ratchet-wheel ($o$ and $n$, respectively) maintain the core in its upright position and the pulley $e$ against the collar $c$. The shaft $g$, belonging to the pulley $e$, winds up the chain $v$, and thereby throws the large pulley against the collar $c$ by operating the lever $w$ about its fulcrum N, which causes the lever $r$ to turn upon its fulcrum M, so that the lever $t$ is operated through the medium of the chain $s$. If the pulleys slip too much, the rheostat E is caused to increase the current. This will cause both pulleys to press harder upon the collar $c$. The spring $j$ prevents pressure from being applied too suddenly, so that no appreciable shock will be felt upon the car.

By referring to Fig. 3 it will be seen that the chain $v$ causes the left-hand end of the lever $w$ to rise, no matter which way the said chain is wound upon the axle $g$, and by referring to Fig. 1 it may be seen that when the said end rises it causes the shaft $f$ to move to the right against the collar $c$, because the lever $r$ is pivoted at M. The total motion of the pulley $d$ is very slight.

The pulleys appear in the drawings large in proportion to the car-wheels. In practice the car-wheels are much larger than shown as compared with the pulleys.

The interior of the smaller solenoid is not illustrated, as it is constructed in a similar manner to that of the large solenoid.

When the train has been sufficiently slowed up, the engineer turns the switch in the opposite direction, and thereby allows the current to energize the solenoid $p$. The core of the solenoid is thereby caused to release the pawl from the ratchet-wheel, which allows the core $k$ to fall to its original position and the pulleys both to be freed from the collar $c$.

In the foregoing specification the description has been confined to the application of solenoids for converting electric energy into mechanical motion; but it is evident that we wish to reserve the right to employ electro-magnets of any known types. We prefer the solenoids, for the reason that a longer pull can be obtained.

The solenoid $p$, together with the lever $o$ and ratchet-gearing, may evidently be called an "electro-magnetic releasing device" for the electric brake, as by turning the switch D, so as to include the said solenoid in the circuit, the brake becomes released from the wheels.

We claim as our invention—

1. In a system of electric brakes, the combination of a friction-pulley of a given size adjustably geared to the car-axle, a mechanical connection between the axle of the pulley and the brake-lever, and a smaller pulley of less diameter, also adjustably geared to the said car-axle and connected through a chain with the operating-lever of the large pulley, the said smaller pulley being connected to the armature of a solenoid which is included in a suitable electric circuit.

2. In a system of electric brakes, the combination of two friction-pulleys, the one connected to the brake-lever and the other to the armature of a solenoid, and both being geared to each other and to the car-axle.

3. In a system of electric brakes, the combination of a car-axle provided with a collar, a friction-pulley supported upon a lever which is connected to the shaft of a pulley of smaller diameter, both pulleys being adjustable relatively to the said collar, a lever applied at one end to the smaller pulley and at the other end elastically to the armature of a solenoid, a retaining device or clamp for the armature, said device consisting substantially of a pawl and ratchet-wheel, and a second solenoid whose armature is connected to the said pawl, the said solenoids being included in suitable electric circuits.

4. In a system of electric brakes, the combination, with the armature of a solenoid, of an elastic connection between the said armature and the lever of the friction-pulley of the brake.

5. In a system of electric brakes, the combination, with an auxiliary friction-pulley, of an elastic connection between the pulley's lever and the armature of the operating-solenoid.

In testimony that we claim the foregoing as our invention we have signed our names, in presence of two witnesses, this 8th day of October, 1887.

W. P. WIDDIFIELD.
A. H. BOWMAN.

Witnesses:
W. H. SPENCER,
L. H. BARBER.